(12) United States Patent
Schuermans et al.

(10) Patent No.: US 9,970,659 B2
(45) Date of Patent: May 15, 2018

(54) DAMPER FOR COMBUSTION OSCILLATION DAMPING IN A GAS TURBINE

(71) Applicant: ANSALDO ENERGIA IP UK LIMITED, London (GB)

(72) Inventors: Bruno Schuermans, La Tour de Peilz (CH); Mirko Ruben Bothien, Zürich (CH)

(73) Assignee: ANSALDO ENERGIA IP UK LIMITED, London (GB)

(*) Notice: Subject to any disclaimer, the term of this patent is extended or adjusted under 35 U.S.C. 154(b) by 363 days.

(21) Appl. No.: 14/444,177

(22) Filed: Jul. 28, 2014

(65) Prior Publication Data

US 2015/0047357 A1 Feb. 19, 2015

(30) Foreign Application Priority Data

Aug. 14, 2013 (EP) .................... 13180355.3

(51) Int. Cl.
*F23R 3/04* (2006.01)
*F23R 3/00* (2006.01)
*F02C 3/14* (2006.01)

(52) U.S. Cl.
CPC .............. *F23R 3/04* (2013.01); *F02C 3/14* (2013.01); *F23R 3/002* (2013.01); *F05D 2260/963* (2013.01); *F23R 2900/00014* (2013.01)

(58) Field of Classification Search
CPC .. F01D 25/04; F23R 3/002; F23R 3/04; F23R 3/06; F23R 3/16; F23R 3/26;
(Continued)

(56) References Cited

U.S. PATENT DOCUMENTS 6,530,221 B1   3/2003  Sattinger et al.
6,634,457 B2 * 10/2003  Paschereit ............. F01N 1/02
                                                       181/219
(Continued)

FOREIGN PATENT DOCUMENTS

EP   0 892 216 A1   1/1999
EP   1 158 247 A2   11/2001
(Continued)

*Primary Examiner* — Arun Goyal
(74) *Attorney, Agent, or Firm* — Buchanan Ingersoll & Rooney PC

(57) ABSTRACT

The invention relating to a A damper for combustion oscillation damping for a gas turbine, includes a resonator cavity with a box or cylinder shape, a neck in flow communication with the resonator cavity and a combustion chamber. The length $L_{neck}$ of the neck is equal or greater than a maximum distance $l_{max}$ that a hot gas ingested from the combustion chamber reaches in the neck. The maximum distance $l_{max}$ is determined according to the following equation:

$$l_{max} = \int_{t_1}^{t_2} U - \frac{\hat{p}}{\rho U \zeta} \sin(\omega t)\, dt.$$

With the solution of the present invention, the damper used to damping combustion oscillation may prevent hot gas ingestion during normal operations by uniquely determining the dimensions of the neck connecting the resonator cavity and the combustion chamber.

10 Claims, 2 Drawing Sheets

(58) Field of Classification Search
CPC .. F23R 2900/00013; F23R 2900/00014; F02C 5/10; F02C 7/24
See application file for complete search history.

(56) References Cited

U.S. PATENT DOCUMENTS

| | | | |
|---|---|---|---|
| 7,080,514 | B2 | 7/2006 | Bland et al. |
| 8,166,763 | B2 * | 5/2012 | Piper ................ F23R 3/283 60/737 |
| 8,931,589 | B2 * | 1/2015 | Bothien ............. F23M 99/005 181/219 |
| 2011/0165527 | A1 * | 7/2011 | Kim .................. F23R 3/002 431/114 |
| 2012/0204534 | A1 * | 8/2012 | Kenyon ................ F02C 5/12 60/204 |
| 2012/0297787 | A1 | 11/2012 | Poyyapakkam et al. |

FOREIGN PATENT DOCUMENTS

| | | |
|---|---|---|
| EP | 2 295 864 A1 | 3/2011 |
| EP | 1 862 739 B1 | 7/2011 |
| EP | 2 397 759 A1 | 12/2011 |
| JP | H10-196475 | 7/1998 |
| JP | 2012-002500 | 1/2012 |
| JP | 2012-520982 | 9/2012 |

* cited by examiner

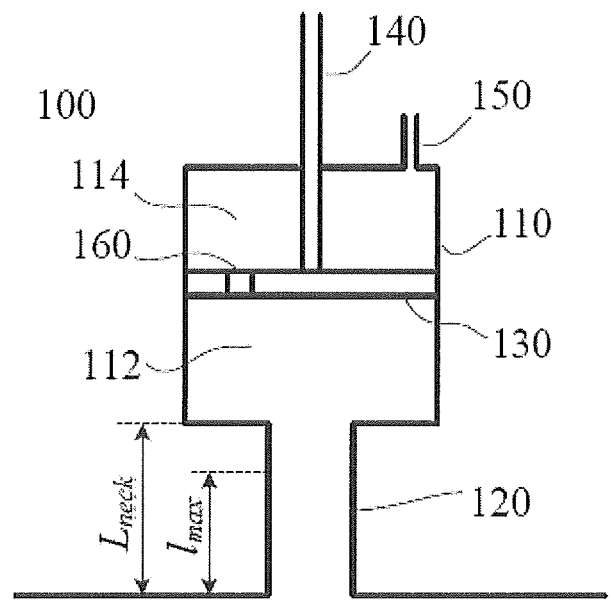
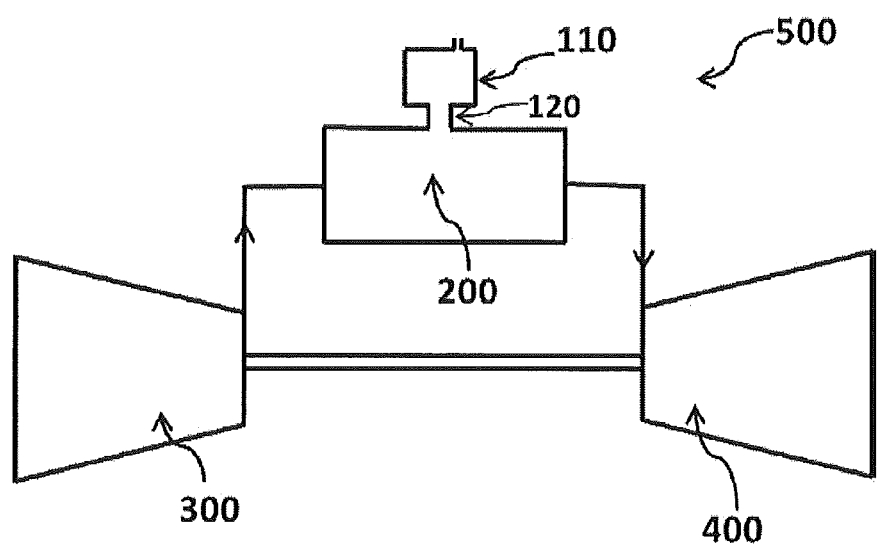
Fig. 3
Fig. 4

DAMPER FOR COMBUSTION OSCILLATION DAMPING IN A GAS TURBINE

CROSS-REFERENCE TO RELATED APPLICATIONS

This application claims priority to European application 13180355.3 filed Aug. 14, 2013, the contents of which are hereby incorporated in its entirety.

TECHNICAL FIELD

The present invention relates to gas turbines, in particular, relates to a damper for combustion oscillation damping in a gas turbine.

BACKGROUND

During engine operation, acoustic pressure oscillations at undesirable frequencies can develop in the combustion chamber due to, for example, burning rate fluctuations inside the combustion chamber. Such pressure oscillations can damage components of the combustion chamber. To avoid such damage, one or more acoustic damping devices can be associated with the combustion chamber of a gas turbine. One type of commonly used acoustic damping device is a Helmholtz resonator. Various examples of Helmholtz resonators are disclosed in U.S. Pat. Nos. 6,530,221 and 7,080,514.

A Helmholtz resonator for use in a combustion chamber of a gas turbine engine is disclosed in EP 1862739 B1, wherein the resonator comprises a resonator cavity and a resonator neck. The resonator neck has a circular cross section with a plurality of circumferentially spaced cooling holes formed in the tube wall. In use, the resonator is thus continually purged with cooling air passing through the array of holes. The purging air keeps the resonator cavity at a temperature at which no thermal damage occurs and beneficially creates a flow of air in the neck that travels from the cavity to the combustion chamber both cooling the neck and preventing ingestion of hot combustor gasses.

A Combustion device for a gas turbine is disclosed in EP 2295864 B1, which comprises a portion provided with a first and a second wall provided with first passages connecting the zone between the first and second wall to the inner of the combustion device and second passages connecting said zone between the first and second wall to the outer of the combustion device, wherein between the first and second wall a plurality of chambers are defined, each connected with one first passage and at least one second passage, and defining a Helmholtz damper, wherein the chambers are defined by at least a first plate interposed between the first and second wall, and the chambers are defined by holes indented in said first plate.

EP 0 892 216 discloses a combustion device with a first and a second wall with first passages connecting the zone between the walls to the inside of the combustion device and second passages connecting the zone between the walls to the outside of the combustion device. EP 0 892 216 also discloses plates between the first and second walls to define chambers (honeycomb structure) that are connected to the first and second passages.

In fact, during operation of the combustion chamber, hot gases may enter from the combustion chamber into the neck between the resonator cavity and the combustion chamber and go out again, coming back into the combustion chamber, which is referred to as hot gas ingestion (HGI). Usually when this occurs, the hot gases may change the temperature inside the resonator cavity, by which the resonance frequency of the Helmholtz resonator is changed. Thus, the damping performance of the damper is decreased. Furthermore, hot gas ingestion may cause severe thermal fatigues to the component of the resonator that usually made of regular materials.

Hot gas ingestion is conventionally prevented by using sufficiently large cooling air to purge the neck in order to suppress the ingestion of the hot gas. However, the volume of the cooling air cannot be chosen to be much large due to deterioration of the damping performance and emission increase of NOx caused thereby.

Even much development has been made in this field, there still exists a need for a damper for combustion oscillation damping that may restrain hot gas ingestion and that further may be made in a cost efficient way.

SUMMARY

It is an object of the present invention to provide a damper for combustion oscillation damping that may satisfy at least one aspect of the above.

A damper for combustion oscillation damping for a gas turbine is proposed according to one example embodiment of the present invention, wherein the damper comprises a resonator cavity with a box or cylinder shape, a neck in flow communication with the resonator cavity and a combustion chamber, wherein the length $L_{neck}$ of the neck equal or greater than a maximum distance $l_{max}$ that a hot gas ingested from the combustion chamber reaches in the neck, wherein the maximum distance $l_{max}$ is determined according to the following equation:

$$l_{max} = \int_{t_1}^{t_2} U - \frac{\hat{p}}{\rho U \zeta} \sin(\omega t)\, dt$$

where U represents the mean flow velocity in the neck, $\hat{p}$ represents the pressure amplitude in the combustion chamber, $\rho$ represents the density of the flow, $\zeta$ represents the pressure loss coefficient.

Since a damper interacts with the combustion chamber another object of the invention is to provide a system for combustion oscillation damping for a gas turbine comprising: a damper and a combustion chamber wherein the damper comprises a resonator cavity with a box or cylinder shape, a neck in flow communication with the resonator cavity and a combustion chamber, wherein the length $L_{neck}$ of the neck equal or greater than a maximum distance $l_{max}$ that a hot gas ingested from the combustion chamber reaches in the neck, wherein the maximum distance $l_{max}$ is determined according to the following equation:

$$l_{max} = \int_{t_1}^{t_2} U - \frac{\hat{p}}{\rho U \zeta} \sin(\omega t)\, dt$$

where during operation of the combustor U represents the mean flow velocity in the neck, $\hat{p}$ represents the pressure amplitude in the combustion chamber, $\rho$ represents the density of the flow, $\zeta$ represents the pressure loss coefficient.

According to one possible embodiment of the present invention, the length $L_{neck}$ of the neck is equal to 1.1~2.0 times of the maximum distance $l_{max}$.

According to one possible embodiment of the present invention, the length $L_{neck}$ of the neck is equal to 1.4~1.8 times of the maximum distance $l_{max}$.

According to one possible embodiment of the present invention, the length $L_{neck}$ of the neck is equal to 1.5 times of the maximum distance $l_{max}$.

According to one possible embodiment of the present invention, the damper further comprises one or more spacers disposed in the resonator cavity to separate the resonator cavity into multiple parts, an inlet tube disposed on the resonator cavity, wherein the effective diameter d of the inlet tube is determined in accordance with the following equation $$d = D\sqrt{U}\left(\frac{3\rho}{4\Delta p_c}\right)^{1/4}$$

wherein $\Delta p_c$ is the pressure over the cooling air supply, D represents the diameter of the neck.

According to one possible embodiment of the present invention, the neck consists of a first neck part and a second neck part, wherein the first neck part is proximate the combustion chamber and is made of heat resistant materials, and the second neck part is distal from the combustion chamber, and wherein the length of the first neck part is dimensioned to be equal or larger than the maximum distance $l_{max}$.

According to one possible embodiment of the present invention, the length of the first neck part is dimensioned to be equal to 1.1~2.0 times of the maximum distance $l_{max}$.

According to one possible embodiment of the present invention, the length of the first neck part is dimensioned to be equal to 1.4~1.8 times of the maximum distance $l_{max}$.

According to one possible embodiment of the present invention, the length of the first neck part is dimensioned to be equal to 1.5 times of the maximum distance $l_{max}$.

With the solution of the present invention, the damper used to damp combustion oscillation may prevent hot gas ingestion during normal operations by uniquely determining the dimensions of the neck connecting the resonator cavity and the combustion chamber. Furthermore, the damper may be fabricated in a cost efficient way.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which:

FIG. 3 shows a schematic view of a damper according to another example embodiment of the present invention.

FIG. 4 shows block diagram of a gas turbine comprising damper in accordance with an exemplary embodiment of the present disclosure

DETAILED DESCRIPTION

Figure 1:
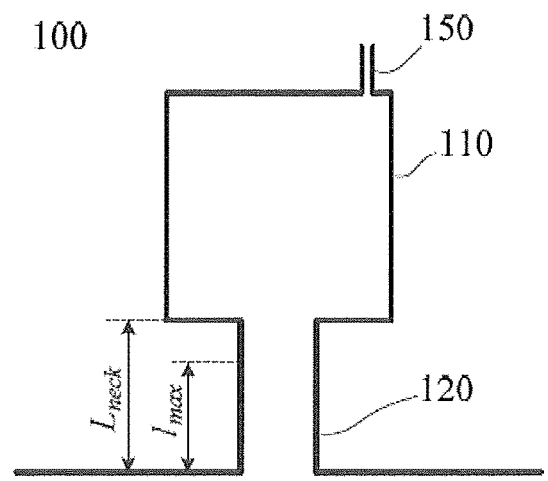
FIG. 1 shows a schematic view of a damper according to one example embodiment of the present invention.

FIG. 1 shows a schematic view of a damper 100 according to one example embodiment of the present invention. The damper 100, in its simplest form, comprises a resonator cavity 110 with a box or cylinder shape and a neck 120 in flow communication with a combustion chamber 200 of a gas turbine, not shown, and the resonator cavity 110. According to example embodiments of the present invention, the cross section of the neck 120 may be any shape, such as circular, square, rectangular, oval, and the like. It prefers to be a circular shape. An inlet tube 150 is disposed on the resonator cavity 110 in order to intake cooling air. It should be understood by those skilled in the art that not all components relating to combustion oscillation damping are shown in FIG. 1. Necessary omission and simplification is made for purpose of clarity.

With combustion fluctuation, hot gas from the combustion chamber 200 dynamically enters into and exists from the neck 120. According to finds of the present inventor, the flow velocity u(t) in the neck 120 may be represented by a superimposition by a mean flow velocity, which may be termed as U, and a sinusoidal component, which may termed as $\hat{u} \sin(\omega t)$, where we may get the equation 1:

$$u(t)=U-\hat{u}\sin(\omega t) \quad (1)$$

Figure 2:
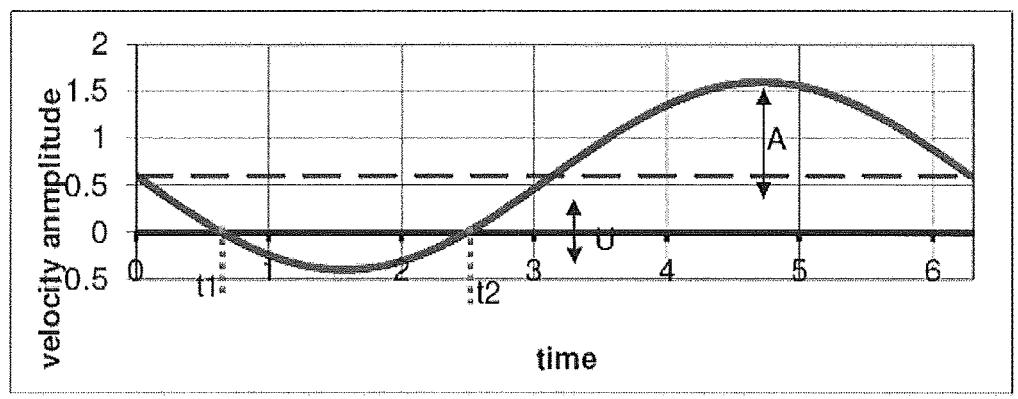
FIG. 2 is a schematic graph showing the flow velocity in the neck with respect to time.

FIG. 2 is a schematic graph showing the flow velocity u(t) in the neck 120 with respect to time. As shown in FIG. 2, the flow velocity u(t) changes direction at $t_1$ and $t_2$, which means the hot gas ingested from the combustion chamber 200 will enter the neck 120 during period of $t_1$~$t_2$ if it is assumed that negative direction of the vertical axis refer to the direction from the combustion chamber 200 to the resonator cavity 110. The maximum distance that the hot gas reach in the neck 200 may be represented by equation 2:

$$l_{max} = \int_{t_1}^{t_2} U - \hat{u}\sin(\omega t)\,dt \quad (2)$$

According to findings of the present inventor, the sinusoidal component in the flow velocity $\hat{u}$ in the neck 120 is related to the pressure amplitude $\hat{p}$ in the combustion chamber 200 via the impedance $Z(\omega)$ of the damper 100 at the resonance frequency, which may be represented by equation 3:

$$\hat{p}=Z(\omega)\hat{u} \quad (3)$$

Furthermore, the impedance $Z(\omega)$ of the damper 100 at the resonance frequency can be approximated by equation 4:

$$Z=\rho U \zeta \quad (4)$$

where $\rho$ represent the density of the flow and $\zeta$ represents the pressure loss coefficient.

Based upon equation (3) and (4), equation (2) may be transformed to be equation (5):

$$l_{max} = \int_{t_1}^{t_2} U - \frac{\hat{p}}{\rho U \zeta}\sin(\omega t)\,dt \quad (5)$$

wherein all relevant parameters such as the angular velocity $\omega$ coming from the oscillation frequency, the mean flow velocity U, the pressure amplitude $\hat{p}$, density of the flow $\rho$, pressure loss coefficient $\zeta$ may be detected and derived by means and algorithms known per se to those skills in the art for a given geometry f the damper and combustion chamber, in particular for a given geometry of the neck inlet and outlet. For example the In addition, due to the fact that the size of the combustion chamber 200 is much bigger than the damper 110, i.e can be considered infinite to simplify the calculation of the loss coefficient is straightforward.

According to one example embodiment, the length $L_{neck}$ of the neck 120 may be selected equal or greater than the maximum distance $l_{max}$, i.e. $L_{neck} \geq l_{max}$, so as to prevent the ingested hot gas from entering the resonator cavity 110 to change the resonance frequency of the damper 100. For example, length $L_{neck}$ may be equal to 1.1~2.0 times of the maximum distance $l_{max}$, i.e., $L_{neck}=(1.1~2.0) l_{max}$, more specifically, length $L_{neck}$ may be equal to 1.4~1.8 times of the maximum distance $l_{max}$, i.e., $L_{neck}=(1.4~1.8) l_{max}$. Specifically, $L_{neck}=1.1 l_{max}$, $L_{neck}=1.2 l_{max}$, $L_{neck}=1.4 l_{max}$, $L_{neck}=1.5 l_{max}$, $L_{neck}=1.8 l_{max}$, or $L_{neck}=2 l_{max}$. In this case, the neck 120 of the damper 100 may be fabricated by heat resistant materials, such as, Haynes 230, Haynes 282, Hasteloy X, or Iconel etc., in order to assure proper operation of the damper 100 when subjecting to the high temperature of the combustion chamber 200.

As an alternative, the neck 120 may consists of two part, wherein a first neck part that is proximate the combustion chamber 200 is made of heat resistant materials, and a second neck part that is distal from the combustion chamber 200, or proximate the resonator cavity 110 is made of regular materials used for Helmholtz damper. In this structure, the length of the first neck part is dimensioned to be equal or larger than the maximum distance $l_{max}$ in order to fabricate a cost efficient damper 100 due to high cost of the heat resistant materials. As mentioned above, the length of the first neck part may be equal to 1.1~2.0 times of the maximum distance $l_{max}$, more specifically, 1.4~1.8 times of the maximum distance $l_{max}$. For example, the length of the first neck part may be equal to 1.1, 1.2, 1.4, 1.5, 1.6, 1.8 or 2.0 times of the maximum distance $l_{max}$.

FIG. 3 shows a schematic view of a damper of another example embodiment according to the present invention. Based upon the structure of the damper 100 as shown in FIG. 1, the damper 100 as shown in FIG. 3 further comprises a spacer 130 moveably disposed in the resonator cavity 110 to separate the resonator cavity 110 into a first part 112 and a second part 114, wherein the first part 112 is proximate the combustion chamber 200 to function as resonator volume, the second part 114 is distal from the combustion chamber 200 to connect with a cooling air supply. A rod 140 is attached to the spacer 130, which can be used to adjust the volume of the first and second part 112, 114 by external control mechanism not shown. In this case, an inlet tube 150 is disposed on the resonator cavity 110 in order to intake cooling air and facilitate the adjustment of the first part 112, and an opening 160 is disposed in the spacer 130 in order to intake cooling air into first part 112 that functions oscillation damping and in flow communication with the combustion chamber 200. According to example embodiments of the present invention, the cross section of the inlet tube 150 may be any shape, such as circular, square, rectangular, oval and the like. In a preferable embodiment, it is circular shape. According to one example embodiment, the effective diameter d of the inlet tube 150 may be determined in accordance with equation 6:

$$d = D\sqrt{U}\left(\frac{3\rho}{4\Delta p_c}\right)^{1/4} \quad (6)$$

wherein $\Delta p_c$ is the pressure over the cooling air supply, D represents the effective diameter of the neck 120.

It should be noted that one and more spacers 130 may be disposed, movably or fixedly, into the resonator cavity 110 to separate the resonator cavity 110 into multiple parts, if necessary. In such cases, the other features of the present invention also apply.

It should be understood that the features described with respect to FIG. 1 equally apply to the damper 100 as shown in FIG. 3, vice versa.

FIG. 4 shows block diagram of a gas turbine 500 comprising the damper in accordance with an exemplary embodiment of the present disclosure. The gas turbine comprises a compressor 300, the combustor chamber 200 and a turbine 400.

With the solution of the present invention, the damper used to damping combustion oscillation may prevent hot gas ingestion during normal operations by uniquely determining the dimensions of the neck connecting the resonator cavity and the combustion chamber. Furthermore, the damper may be fabricated in a cost efficient way.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for combustion oscillation damping for a gas turbine comprising:
   a damper, and a combustion chamber, wherein the damper includes:
   a resonator cavity having a cross section in a shape of one of a rectangle, a square or a cylinder, a neck in flow communication with the resonator cavity and the combustion chamber, wherein a length $L_{neck}$ of the neck is equal or greater than a maximum distance $l_{max}$, wherein a hot gas ingested from the combustion chamber will reach the maximum distance $l_{max}$ in the neck, wherein the maximum distance $l_{max}$ is determined according to an equation:

$$l_{max} = \int_{t_1}^{t_2} U - \frac{\hat{p}}{\rho U \zeta}\sin(\omega t)\, dt$$

wherein U represents a mean flow velocity in the neck, $\hat{p}$ represents a pressure amplitude in the combustion chamber, $\rho$ represents a density of flow, and $\zeta$ represents a pressure loss coefficient, wherein the neck includes a first neck part and a second neck part, wherein the first neck part is proximate the combustion chamber and is made of a first material that is heat resistant, and the second neck part is distal from the combustion chamber and is made from a second material that is different from the first material, and wherein a length of the first neck part is dimensioned to be equal or larger than the maximum distance $l_{max}$.

2. The system according to claim 1, wherein the length $L_{neck}$ of the neck is equal to 1.1~2.0 times of the maximum distance $l_{max}$.

3. The system according to claim 1, wherein the length $L_{neck}$ of the neck is equal to 1.4~1.8 times of the maximum distance $l_{max}$.

4. The system according to claim 1, wherein the length $L_{neck}$ of the neck is equal to 1.5 times of the maximum distance $l_{max}$.

5. The system according to claim 1, wherein the damper comprises:
   one or more spacers disposed in the resonator cavity to separate the resonator cavity into multiple parts, and an inlet tube disposed on the resonator cavity, wherein an effective diameter d of the inlet tube is determined in accordance with an equation:

$$d = D\sqrt{U}\left(\frac{3\rho}{4\Delta p_c}\right)^{1/4}$$

wherein $\Delta p_c$ is a pressure over a cooling air supply, and D represents an effective diameter of the neck.

6. The system according to claim 5, wherein a cross section of the inlet tube is shaped as circular, square, rectangular or oval.

7. The system according to claim 1, wherein the length of the first neck part is dimensioned to be equal to 1.1~2.0 times of the maximum distance $l_{max}$.

8. The system according to claim 1, wherein the length of the first neck part is dimensioned to be equal to 1.4~1.8 times of the maximum distance $l_{max}$.

9. The system according to claim 1, wherein the length of the first neck part is dimensioned to be equal to 1.5 times of the maximum distance $l_{max}$.

10. The system according to claim 1, wherein a cross section of the neck is shaped as circular, square, rectangular or oval.

* * * * *